United States Patent [19]
Tung

[11] Patent Number: 5,860,113
[45] Date of Patent: Jan. 12, 1999

[54] SYSTEM FOR USING A DIRTY BIT WITH A CACHE MEMORY

[75] Inventor: Hsu-Tien Tung, San Jose, Calif.

[73] Assignee: OPTi Inc., Milpitas, Calif.

[21] Appl. No.: 660,205

[22] Filed: Jun. 3, 1996

[51] Int. Cl.$^6$ ................................................ G06F 12/00
[52] U.S. Cl. .................. 711/144; 711/142; 711/143; 711/145
[58] Field of Search ..................... 395/471, 445, 395/403, 468, 472, 440; 711/142, 143, 144, 145

[56] References Cited

U.S. PATENT DOCUMENTS

| | | | |
|---|---|---|---|
| 4,939,641 | 7/1990 | Schwartz et al. | 395/471 |
| 5,420,994 | 5/1995 | King et al. | 395/471 |
| 5,537,575 | 7/1996 | Foley et al. | 395/468 |
| 5,553,266 | 9/1996 | Metzger et al. | 395/471 |

*Primary Examiner*—Eddie P. Chan
*Assistant Examiner*—Than V. Nguyen
*Attorney, Agent, or Firm*—Fliesler, Dubb, Meyer & Lovejoy LLP

[57] ABSTRACT

A system for writing to a cache memory which eliminates the need, in certain circumstances, to set a dirty bit. The dirty bit indicates that the line of data in the cache has been updated but the corresponding data in main memory has not been updated. Setting the dirty bit can increase the time needed for a bus cycle. When a line of data is written to a cache memory, a dirty bit is set for that line of data. If the next bus cycle is a write to the cache for the same line of data, the cache controller can save time by not setting the dirty bit because the cache controller knows that the dirty bit has been previously set.

19 Claims, 6 Drawing Sheets

SYSTEM FOR USING A DIRTY BIT WITH A CACHE MEMORY

BACKGROUND OF THE INVENTION

1. Field of the Invention

The present invention is directed to a system for using a dirty bit in a cache memory.

2. Description of the Related Art

In a typical IBM PC/AT-compatible computer system, a host processing unit is coupled to a host bus and most I/O peripheral devices are coupled to a separate I/O bus. The host processing unit typically comprises an Intel i386, i486 or Pentium™ microprocessor, and the I/O bus typically conforms to a standard known as ISA (Industry Standard Architecture). I/O interface circuitry, which usually comprises one or more chips in a "core logic chip set", provides an interface between the two buses. A typical system also includes a memory subsystem, which usually comprises a large array of DRAMs and perhaps a cache memory.

General information on the various forms of IBM PC AT-compatible computers can be found in IBM, "Technical Reference, Personal Computer AT" (1985), in Sanchez, "IBM Microcomputers: A Programmer's Handbook" (McGraw-Hill: 1990), in MicroDesign Resources, "PC Chip Sets" (1992), and in Solari, "AT Bus Design" (San Diego: Annabooks, 1990). See also the various data books and data sheets published by Intel Corporation concerning the structure and use of the 80×86 family of microprocessors, including Intel Corp., "Pentium™ Processor", Preliminary Data Sheet (1993); Intel Corp., "Pentium™ Processor User's Manual" (1994); "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). In addition, a typical core logic chipset includes the OPTi 82C802G and either the 82C601 or 82C602, all incorporated herein by reference. The 82C802G is described in OPTi, Inc., "OPTi PC/AT Single Chip 82C802G Data Book", Version 1.2a (Dec. 1, 1993), and the 82C601 and 82C602 are described in OPTi, Inc., "PC/AT Data Buffer Chips, Preliminary, 82C601/82C602 Data Book", Version 1.0e (Oct. 10, 1993). All the above references are incorporated herein by reference.

Many IBM PC AT-compatible computers today include one, and usually two, levels of cache memory. A cache memory is a high-speed memory that is positioned between a microprocessor and main memory in a computer system in order to improve system performance. Cache memories (or caches) store copies of portions of main memory data that are actively being used by the central processing unit (CPU) while a program is running. Since the access time of a cache can be faster than that of main memory, the overall access time can be reduced. Descriptions of various uses of and methods of employing caches appear in the following articles: Kaplan, "Cache-based Computer Systems," *Computer,* 3/73 at 30–36; Rhodes, "Caches Keep Main Memories From Slowing Down Fast CPUs," *Electronic Design*, Jan. 21, 1982, at 179; Strecker, "Cache Memories for PDP-11 Family Computers," in Bell, *"Computer Engineering"* (Digital Press), at 263–67, all incorporated herein by reference. See also the description at pp. 6-1 through 6-11 of the "i486 Processor Hardware Reference Manual" incorporated above.

Many microprocessor-based systems implement a "direct mapped" cache memory. In general, a direct mapped cache memory comprises a high speed data Random Access Memory (RAM) and a parallel high speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the i'th line in the cache data RAM will be a copy of the i'th line of one of the $2^m$ in blocks in main memory. The identity of the main memory block that the line came from is stored in the i'th location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache or main memory or both may be updated.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "K-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that the data has been written into the cache but not into the main memory. A cache controller checks for a dirty bit before overwriting any line of data in the cache, and if set, writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the L1 cache, and main memory (e.g. DRAM) is located logically behind the second level cache. When the host processor performs an access to an address in the memory address space, the L1 cache responds if possible. If the L1 cache cannot respond (for example, because of an L1 cache miss), then the L2 cache responds if possible. If the L2 cache also cannot respond, then the access is made to main memory. The host processor does not need to know how many levels of caching are present in the system or indeed that any caching exists at all. Similarly, the L1 cache does not need to know whether a second level of caching exists prior to main memory. Thus, to the host processing unit, the combination of both caches and main memory is considered merely as a single main memory structure. Similarly, to the L1 cache, the combination of the L2 cache and main memory is considered simply as a single main memory structure. In fact, a third level of caching could be included between the L2 cache and the main memory, and the L2 cache would still consider the combination of L3 and main memory as a single main memory structure.

As the x86 family of microprocessors has advanced, additional functions have been included on the microprocessor chip itself. For example, while i386-compatible microprocessors did not include any cache memory on-chip, the i486-compatible microprocessors did. Specifically, these microprocessors included a level one, "write-through" cache memory.

Pentium-compatible microprocessors also include a level one cache on-chip. This cache is divided into a data cache and a separate code cache. Unlike the cache included on the i486-compatible microprocessor chips, the data cache on a Pentium chip follows a write-back policy. The cache is actually programmable on a line-by-line basis to follow a write-through or a write-back policy, but special precautions must be taken externally to the chip as long as even one line is to follow a write-back policy. The data cache on a Pentium chip implements a "modified/exclusive/shared/invalid" (MESI) write-back cache consistency protocol, whereas the code cache only supports the "shared" and "invalid" states of the MESI protocol. The MESI protocol is described in "Intel, "Pentium Processor User's Manual, Vol. 1: Pentium Processor Databook" (1993), incorporated herein by reference.

In Pentium-based systems, an L2 cache typically is part of a supporting chip set. One drawback of current L2 cache designs is that they include a performance penalty for setting the dirty bit. For example, one L2 cache that can be used is a write back cache which includes a tag store for storing L2 tags and a dirty bit store for storing L2 dirty bits. Typically, the tag store and dirty bit store are SRAMs. To save resources (cost, space, power, heat, silicon etc.), the tag store and dirty bit store can be combined onto one SRAM. For example, a 32kx9 SRAM can be used to store eight bit tags and a dirty bit for each line in the L2 cache, or a 32kx8 SRAM can be used to store a 7 bit tag and a dirty bit. However, such a configuration can slow down the system during some memory cycles. A 32kx9 SRAM will typically include one set of bidirectional pins for both reading and writing the tags and dirty bit. A default state is likely to be output. When writing dirty bits it will be necessary to use one half of a clock cycle to assert a write enable which would change the dirty bit pin to an input. A second clock cycle is needed to actually write to the dirty bit. Thus, using a bidirectional pin to write to and read from the dirty bit store can cause a performance penalty. In some designs, setting the dirty bit can cause a performance penalty even if the dirty bit store is separate from the tag store and/or has separate data input and output pins.

Since computers are judge by their price and performance, computer makers strive to increase the speed and efficiency of their computers without increasing costs. Thus, there is a need for a system of writing to a cache memory that reduces the performance penalty for setting a dirty bit.

SUMMARY OF THE INVENTION

The present invention is directed to overcome the disadvantages of the prior art. Thus, the present invention, roughly described, provides for a system for writing to a cache memory which eliminates the need, in certain circumstances, to set a dirty bit. When a line of data is written to a cache memory, a dirty bit is set for that line of data. If the next bus cycle is a write to the same line of data in the cache memory, the cache controller can save a clock period by not setting the dirty bit because the cache controller knows that the dirty bit is already set for that line of data. Alternatively, a cache controller (or other logic) can monitor the address bits used to write to the cache. If two successive cache writes (rather than successive bus cycles) are to the same address, then the cache controller knows that the dirty bit has already been set and there is no need to waste time setting the dirty bit again. Another alternative includes monitoring more than just one previous bus cycle (e.g. monitoring two or more previous cycles).

One embodiment of the present invention includes the steps of storing at least one previous write address, receiving write data, receiving a current address, comparing at least a portion of the current address with at least a portion of the at least one previous write address, writing the write data to the cache memory, and setting a dirty bit associated with the write data unless the portion of the at least one previous write address matches the portion of the current address. In one embodiment, the portion of the current address is a line address. Although the disclosed embodiments contemplates using the present invention in conjunction with a level 2 cache, the present invention can be used with any level cache memory.

An alternative embodiment includes a method for writing to a cache memory in response to a write access, where the write access follows a set of one or more previous cache writes. The cache memory is divided into blocks of storage areas and the blocks of storage areas include a first block. The steps include receiving write data, writing the write data to the first block and setting a dirty bit associated with the first block unless one of the set of previous cache writes has written previous data to the first block.

One embodiment of the present invention includes a system for writing to a cache memory. The cache memory includes a tag store and a dirty bit store. The system receives an address and write data. The address includes a plurality of address bits. The system comprises a tag comparator, a line comparator and cache control logic. The tag comparator communicates with the tag store and receives at least a first subset of the address bits. The line comparator has a first input which receives at least a second subset of the address bits. The cache control logic is in communication with the tag store, the tag comparator and the line comparator.

These and other objects and advantages of the invention will appear more clearly from the following description in which the preferred embodiment of the invention has been set forth in conjunction with the drawings.

DETAILED DESCRIPTION

Figure 1:
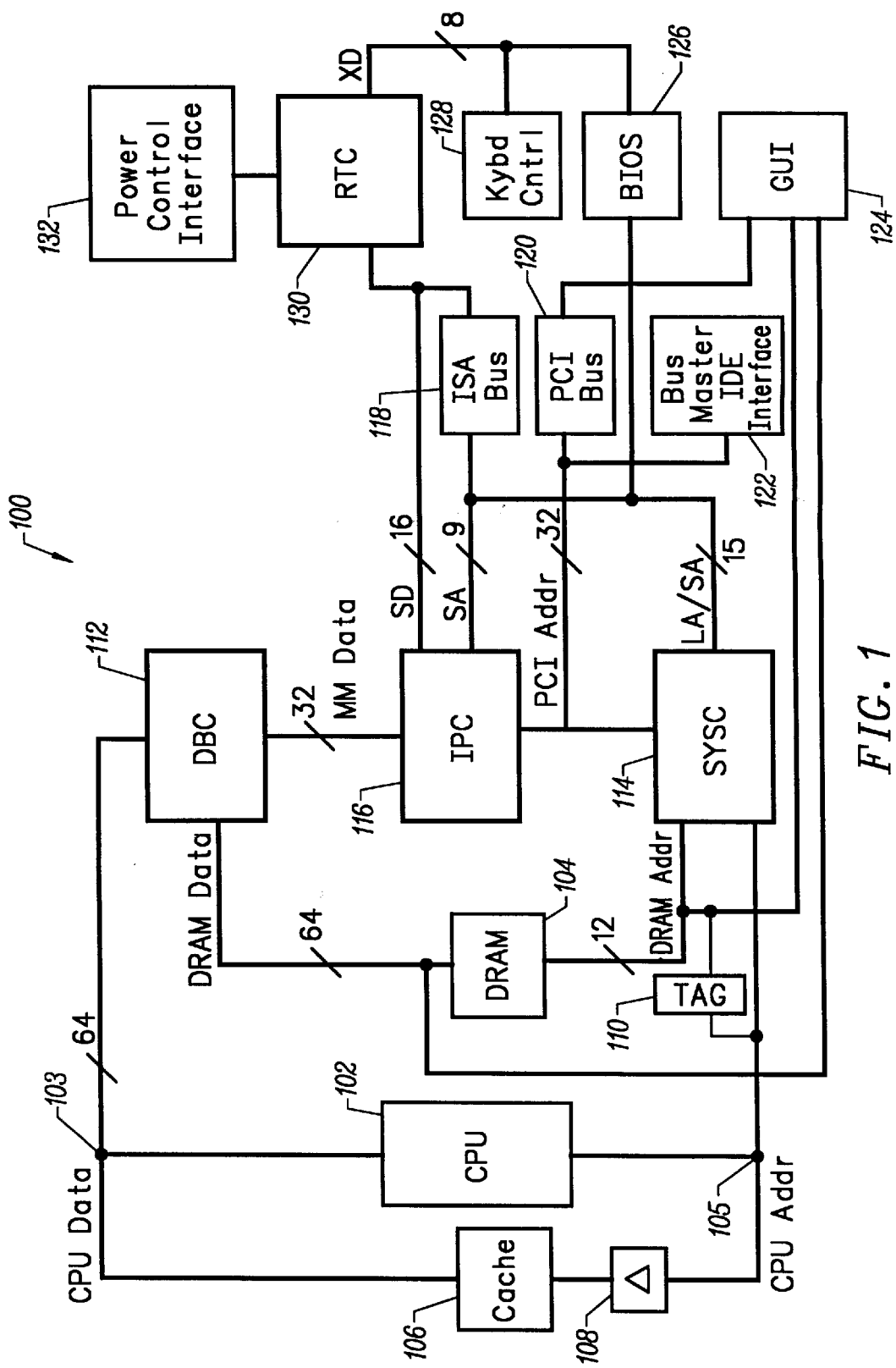
FIG. 1 is a block diagram of a system which utilizes the present invention.

FIG. 1 shows a block diagram of one exemplar computer system which utilizes the present invention. At the heart of the computer system is Central Processing Unit (CPU) 102 which can be a Pentium processor, manufactured by Intel Corporation, Santa Clara, Calif. The system shown in FIG. 1 also supports many other processors: CPU 102 includes an internal L1 cache. The L1 cache actually includes two caches: a data cache and a code cache.

System 100 also includes DRAM(s) 104 which serves as main memory, an L2 cache 106 and a tag store 110 to be used with L2 cache 106. Cache 106, tag store 110 and System Controller 114 receive an address from CPU 102. The output of tag store 110 is communicated to System Controller 114. The output of cache 106 is communicated to CPU 102 and Data Buffer Controller 112. System Controller 114 addresses DRAMs 104. The data output of DRAMs 104 is sent to Data Buffer Controller 112. Also included is an address latch 108. The system supports a write back or write through, direct mapped cache ranging in sizes from 64 KB, 128 KB, 256 KB, 512 KB, 1 MB and 2 MB. The disclosed embodiment is a 256 KB write back, direct mapped cache. However, other cache architectures/organizations (one example being a k-way set associative cache) and other cache sizes can be used within the spirit of the present invention. Additionally, although the disclosed cache is divided into lines of data, other arrangements for dividing a cache into blocks of storage areas can also be used with the present invention.

Data Buffer Controller 112 performs the task of buffering CPU 102 to DRAM 104 and DRAM 104 to PCI Bus 120. Data Buffer Controller 112 includes a CPU Bus Interface, an interface to System Controller 114 and an interface to DRAM 104. System Controller 114 controls the data flow between CPU 102, DRAM 104, L2 cache 106 and ISA Bus 118. System Controller 114 will be discussed in more detail below. Integrated Peripherals Controller 116 contains a ISA Bus Controller for controlling ISA Bus 118, an RTC interface for interfacing with real time clock 130, a DMA controller, and a serial interrupt controller. Integrated Peripherals Controller 116 also includes a sophisticated system power management unit. Integrated Peripherals Controller 116 is in communication with Data Buffer Controller 112 and System Controller 114.

Integrated Peripherals Controller 116 communicates a 32 bit PCI address to the PCI Bus 120 and Bus Master IDE Interface 122, which is used to communicate with an IDE hard disk. Integrated Peripheral Controller 116 also controls ISA Bus 118 and communicates with a real time clock and buffer 130. Connected to real time clock and buffer 130 is power controller 132, keyboard control 128 and BIOS 126. Typically, BIOS 126 is an EPROM (or flash EEPROM) which stores basic input and output system information. BIOS 126 is also connected to the system address bus, which is used for communication between BIOS 126, Integrated Peripheral Controller 116, System Controller 114 and ISA Bus 118. In communication with PCI Bus 120, the input of DRAM 104, the output of DRAM 104 and tag store 110 is a graphical user interface 124. The system depicted in FIG. 1, described for example purposes, is one system that can utilize the present invention. Various other computer systems can also utilize the present invention. Thus, the scope of the present invention should not be limited to any particular computer system.

Figure 2:
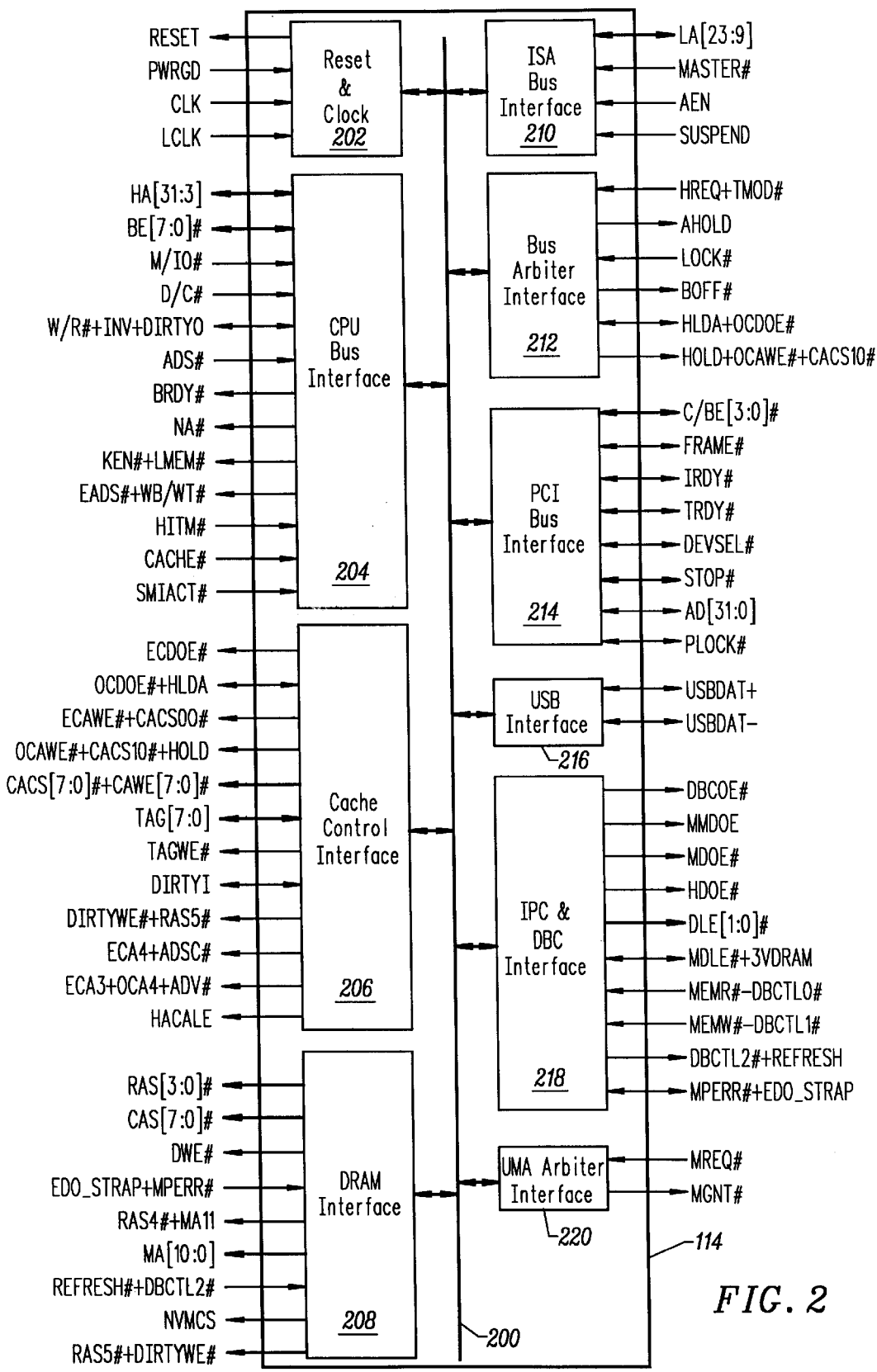
FIG. 2 is a block diagram of the system controller of the system depicted in FIG. 1.

FIG. 2 shows a block diagram of System Controller 114. In communication with system controller bus 200 are Reset and Clock Logic 202, CPU Bus Interface 204, Cache Control Interface 206, DRAM interface 208, ISA Bus Interface 210, Bus Arbiter Interface 212, PCI Bus Interface 214, USB Interface 216, Integrated Peripheral Controller and Data Base Controller Interface 218 and UMA Arbiter Interface 220.

Reset and Clock Logic 202 receives a clock signal and is used to assert a reset signal to CPU 102. Table 1 includes description of the function of the four I/O signals of Reset and Clock Logic 202.

TABLE 1

Reset and Clock Signals

| Signal Name | Pin No. | Signal Type (Drive) | Selected By | Reset and Clock Signals Signal Description |
|---|---|---|---|---|
| RESET | 204 | O (8 mA) | | System Reset: When asserted, this signal resets the CPU. When the PWRGD signal makes a low-to-high transition, RESET is asserted and is guaranteed to be active for 1 ms such that CLK and VCC are stable. |
| PWRGD | 70 | I-S | | Power Good: This input reflects the "wired-OR" status of the external reset switch and the power good status from the power supply. |
| CLK | 175 | I-TTL | | Clock: This input is used as the master single frequency clock. This signal has to be identical to the clock signal sent to the CPU. |
| LCLK | 131 | I-TTL | | Local Bus Clock: This clock is used by the PCI bus state machine within the System Controller. The same clock or another identical signal is used by the local bus devices. For a synchronous PCI implementation, this signal can be skewed from the CLK input by a margin of ±2 ns. |

CPU Bus Interface 204 provides an interface to CPU 102, including performing the necessary handshaking between System Controller 114 and CPU 102 regarding the CPU bus. The CPU bus is the 64 bit data bus 103 and the 32 bit address bus 105 of the CPU 102. CPU Bus Interface 204 receives the high order 28 bits of the CPU address, as well as other signals which are used to manage the CPU bus. The CPU bus is used during a bus cycle to transfer data to and from memory (or the cache). A bus cycle begins with CPU 102 driving an address and asserting ADS#, and ends when the last BRDY# is returned. A bus cycle may have one or four data transfers. A burst cycle is a bus cycle of four data transfers. Processor 102 supports a number of different types of bus cycles. The simplest type of bus cycle is a single transfer non-L1-cacheable 64 bit cycle. Processor 102 initiates a cycle by asserting the address status signal ADS# in the first clock period. The clock period in which ADS# is asserted is by definition the first clock period in the bus cycle. ADS# indicates that a valid bus cycle definition and address is available. The CACHE# output of CPU 102 is deasserted to indicate that the cycle will be a single transfer cycle. BRDY# is returned to CPU 102 from system controller 114 which indicates that the system has presented valid data on the data pins of CPU 102 in response to a read or that the system has accepted data in response to a write.

Table 2 describes the functions of the I/O signals for CPU Bus Interface 204. The # symbol at the end of a signal name generally indicates that the active, or asserted state occurs when the signal is at a low voltage. When a # is not present after the signal name, the signal is active (or asserted) at the high voltage level.

TABLE 2

CPU Bus Interface Signals

| Signal Name | Pin No. | Signal Type (Drive) | Selected By | CPU Bus Interface Signals Signal Description |
|---|---|---|---|---|
| HA[31:3] | 40:39 37:16 14:10 | I/O-TTL (4 mA) | | Host Address Bus Lines 31–3: HA[31:3] are the address lines of the CPU bus. HA[31:3] are connected to the CPU A[31:3] lines. Along with the byte enable signals, the HA[31:3] lines define the physical area of memory or I/O being accessed. During CPU cycles, the HA[31:3] lines are inputs to the System Controller. They are used for address decoding and second level cache tag lookup sequences. During inquire cycles, the HA[31:5] are outputs to snoop the first level cache tags. They also can be outputs from the L2 cache. HA[31:3] have internal pull-downs, however, external pull-ups should be used on HA3 and HA4. |
| BE[7:0]# | 41:48 | I/O-TTL (4 mA) | | Byte Enables 7–0: The byte enables indicate which byte lanes on the CPU data bus are carrying valid data during the current bus cycle. They are inputs for CPU cycles and outputs for master or DMA cycles. In the case of cacheable reads, all eight bytes of data are driven to the CPU, regardless of the state of the byte enables. The byte enable signals indicate the type of special cycle when M/IO# = D/C# = 0 and W/R# = 1. BE[7:0]# have internal pull-downs that are activated when HLDA is active. |
| M/IO# | 205 | I-TTL | | Memory/Input-Output: M/IO#, D/C#, and W/R# define CPU bus cycles. Interrupt acknowledge cycles are forwarded to the PCI bus as PCI interrupt acknowledge cycles. All I/O cycles and any memory cycles that are not directed to memory controlled by the DRAM interface of the System Controller are forwarded to PCI. |
| D/C# | 206 | I-TTL | | Data/Control: D/C#, M/IO#, and W/R# define CPU bus cycles. (See M/IO# definition above.) |
| W/R# | 207 | I-TTL | Cycle Multi- plexed | Write/Read: W/R#, D/C#, and M/IO# define CPU bus cycles. (See M/IO# definition above.) |
| INV | | I-TTL | | Invalidate: Pin 207 also serves as an output signal and is used as INV for L1 cache during an inquire cycle. |
| DIRTYO | | I/O-TTL (4 mA) | | Dirty Output: Pin 207 also serves as an output signal and is used as DIRTYO for L2 cache during an inquire cycle. If a combined Tag/Dirty RAM implementation is being used, then the W/R# pin does not serve as a DIRTYO pin. |
| ADS# | 2 | I-TTL | | Address Strobe: The CPU asserts ADS# to indicate that a new bus cycle is beginning. ADS# is driven active in the same clock as the address, byte enables, and cycle definition signals. ADS# has an internal pull-up resistor that is disabled when the system is in the Suspend mode. |
| BRDY# | 3 | O (8 mA) | | Burst Ready: BRDY# indicates that the system has responded in one of three ways: 1) Valid data has been placed on the CPU data bus in response to a read, 2) CPU write data has been accepted by the system, or 3) the system has responded to a special cycle. |
| NA# | 4 | O (8 mA) | | Next Address: This signal is connected to the CPU's NA# pin to request pipelined addressing for local memory cycle. The System Controller asserts NA# for one clock when the system is ready to accept a new address from the CPU, even if all data transfers for the current cycle have not completed. The 3.3V Pentium process and the M1 processor support pipelined memory |

TABLE 2-continued

CPU Bus Interface Signals

| Signal Name | Pin No. | Signal Type (Drive) | Selected By | CPU Bus Interface Signals Signal Description |
|---|---|---|---|---|
| | | | | accesses, however, the K5 processor does not support this feature. |
| KEN# | 5 | O (8 mA) | Cycle Multi-plexed | Cache Enable: This pin is connected to the KEN# input of the CPU and is used to determine whether the current cycle is cacheable. |
| LMEM# | | O (8 mA) | | Local Memory Accessed: During master cycles, the System Controller asserts this signal to inform the Integrated Peripherals Controller that local system memory needs to be accessed. The Integrated Peripherals Controller is then responsible for providing the data path to the corresponding master. |
| EADS# | 6 | O (8 mA) | Cycle Multi-plexed | External Address Strobe: This output indicates that a valid address has been driven onto the CPU address bus by an external device. This address will be used to perform an internal cache inquiry cycle when the CPU samples EADS# active. |
| WB/WT# | | O (8 mA) | | Write-Back/Write-Through: Pin 6 is also used to control write-back or write-through policy for the primary cache during CPU cycles. |
| HITM# | 49 | I-TTL | | Hit Modified: Indicated that the CPU has had a hit on a modified line in its internal cache during an inquire cycle. It is used to prepare for write-back. |
| CACHE# | 51 | I-TTL | | Cacheability: This input is connected to the CACHE# pin of the CPU. It goes active during a CPU initiated cycle to indicate when, an internal cacheable read cycle or a burst write-back cycle, occurs. |
| SMIACT# | 50 | I-TTL | | System Management Interrupt Active: The CPU asserts SMIACT# in response to the SMI# signal to indicate that it is operating in System Management Mode (SMM). |

Cache Control Interface 206 is used to control the L2 cache 106 which includes managing tag store 110. Table 3 provides a description of the I/O signals for the cache control interface 206.

TABLE 3

Cache Control Interface Signals

| Signal Name | Pin No. | Signal Type (Drive) | Selected By | Cache Control Interface Signals Signal Description |
|---|---|---|---|---|
| ECDOE# | 54 | O (8 mA) | | Even Bank Cache Output Enable: It is connected to the output enables of the SRAMs in the even bank of the L2 cache to enable data read. |
| OCDOE# | 55 | O (8 mA) | Register Program-mable | Odd Bank Cache Output Enable, Hold Acknowledge: It is connected to output enables of the SRAMs in the odd bank of the L2 cache to enable data read. |
| HLDA | | I-TTL | | CPU Hold Acknowledge: This input is connected to the HLDA pin of the CPU. HLDA indicates, in response to a HOLD, when the CPU has relinquished bus control to another bus master. |
| ECAWE# | 56 | O (8 mA) | Register Program-mable | Even Bank Cache Write Enable: For asynchronous L2 cache operations, this pin becomes ECAWE# and is connected to the write enables of the SRAMs in the even bank of the L2 cache to enable data update. |
| CACS0O# | | O (8 mA) | | Bank 0 Synchronous SRAM Chip Select: For synchronous L2 cache operation, this pin provides the chip select for the second bank (synchronous L2 cache is always non-interleaved). |
| OCAWE# | 57 | O (8 mA) | Register Program-mable | Odd Bank Cache Write Enable: For asynchronous L2 cache operations this pin becomes OCAWE# and is connected to the write enables of the SRAMs in the odd bank of the L2 cache to enable data update. |
| CACS1O# | | O (8 mA) | | Bank 1 Synchronous SRAM Chip Select: For synchronous L2 cache operation, this pin provides the chip select for the first bank (synchronous L2 cache is always non-interleaved). |
| HOLD | | O (8 mA) | | CPU Hold Request: This output is connected to the HOLD input of the CPU. HOLD requests that the CPU allow another bus master complete control of its buses. In response to HOLD going active, the CPU will float most of its output and bidirectional |

TABLE 3-continued

Cache Control Interface Signals

| Signal Name | Pin No. | Signal Type (Drive) | Selected By | Cache Control Interface Signals Signal Description |
|---|---|---|---|---|
| CACS[7:0]# | 62:69 | O (4 mA) | Register Programmable | pins and then assert HLDA. Cache Chip Selects 7–0: For asynchronous L2 cache operations these pins become chip selects and are connected to the chip selects of the SRAMs in the L2 cache in both banks to enable data read/write operations. |
| CAWE[7:0]# | | O (4 mA) | | Cache Write Enables 7–0: For synchronous L2 cache operation these pins become cache write enables for the SRAMs. |
| TAG[7:0]# | 191:198 | I/O-TTL (4 mA) | | Tag RAM Data Bits 7–0: Normally input signals, they become outputs whenever TAGWE# is activated to write new Tags to the Tag RAM. If using a combined Tag/Dirty RAM implementation and a 7-bit Tag is used, then TAG0 functions as the Dirty I/O bit. |
| TAGWE# | 199 | O (8 mA) | | TAG RAM Write Enable: This control strobe is used to update the Tag RAM with the valid Tag of the new cache line that replaces the current one during external cache read miss cycles. If using a combined Tag/Dirty RAM implementation, this signal functions as both the TAGWE# and DIRTYWE#. |
| DIRTYI | 190 | I/O-TTL | | Dirty Bit: This input signal represents the dirty bit of the Tag Ram and is used to indicate whether a corresponding cache line has been overwritten. If using a combined Tag/Dirty implementation, this pin becomes bidirectional. If using a 7-bit Tag in a combined Tag/Dirty RAM implementation, then this pin is not used. |
| DIRTYWE# | 189 | O (8mA) | Register Programmable | Dirty RAM Write Enable: This control strobe is used to update the dirty bit RAM when a cache write hit occurs. A cache write hit will set the dirty bit for the currently accessed cache line. If using a combined Tag/Dirty implementation, |

TABLE 3-continued

Cache Control Interface Signals

| Signal Name | Pin No. | Signal Type (Drive) | Selected By | Cache Control Interface Signals Signal Description |
|---|---|---|---|---|
| | | | | this signal is not used to update the Dirty RAM. |
| RAS5# | | O (8 mA) | | Row Address Strobe Bit 5: Each RAS# signal corresponds to a unique DRAM bank. Depending on the kind of DRAM modules being used, this signal may or may not need to be buffered externally. This signal, however, should be connected to the corresponding DRAM RAS# line through a damping resistor. |
| ECA4 | 59 | O (8 mA) | Register Programmable | Even Cache Address 4: For an asynchronous L2 cache, if a single bank is used, this pin is mapped from HA4 and connected to the second LSB of the cache SRAMs address inputs. For a double bank configuration, it is connected to the LSB of the cache SRAMs address input in the even bank. |
| ADSC# | | O (8 mA) | | Controller Address Strobe: For a synchronous L2 cache, this pin is connected to the ADSC# input of the synchronous SRAMs. |
| ECA3 | 60 | O (8 mA) | Register Programmable | Even Cache Address 3: For asynchronous L2 cache operations in a single bank configuration, this pin takes on the functionality of ECA3 and is mapped from HA3 and connected to the cache SRAMs LSB address input. |
| OCA4 | | O (8 mA) | | Odd Cache Address 4: For asynchronous L2 cache operations in a double bank configuration, this pin takes on the functionality of OCA4 and is mapped from HA4 and connected to the LSB address input of the SRAMs in the odd bank. |
| ADV# | | O (8 mA) | | Advance Output: For synchronous L2 cache operation, this pin becomes the advance output and is connected to the ADV# input of the synchronous SRAMs. |

TABLE 3-continued

Cache Control Interface Signals

| Signal Name | Pin No. | Signal Type (Drive) | Selected By | Cache Control Interface Signals Signal Description |
|---|---|---|---|---|
| HACALE | 58 | O (8mA) | | Cache Address Latch Enable: It is used to latch the CPU address and generate latched cache addresses for the L2 cache. |

DRAM Interface 208 is used to interface with the main memory. This includes addressing and enabling DRAMs 104. Table 4 provides a description with the I/O signals of the DRAM interface 208.

TABLE 4

DRAM Interface Signals

| Signal Name | Pin No. | Signal Type | Selected By | DRAM Interface Signals Signal Description |
|---|---|---|---|---|
| RAS[3:0]# | 87:90 | O (4mA) | | Row Address Strobe Bits 3 through 0: Each RAS# signal corresponds to a unique DRAM bank. Depending on the kind of DRAM modules being used, these signals may or may not need to be buffered externally. These signals, however, should be connected to the corresponding DRAM RAS# lines through a damping resistor. RAS4# is pin-wise programmable with MA11 and RAS5# is pin-wise programmable with DRITYWE#. RAS0# is used to share the bank with the GUI in a Unified Memory Architecture system design. |
| CAS[7:0]# | 91:95 97:99 | O (8 mA) | | Column Address Strobe Bits 7–0: The CAS[7:0]# outputs correspond to the eight bytes for each DRAM bank. Each DRAM bank has a 64-bit data bus. These signals are typically connected directly to the DRAMs CAS# inputs through a damping resistor. |
| DWE# | 86 | O (16 mA) | | DRAM Write Enable: This signal is typically buffered externally before connection to the WE# input of the DRAMs. |
| EDO_STRAP | 179 | I | | EDO DRAM Strop Option: This signal must be strapped low for EDO DRAM functionality and strapped high for fast page mode DRAMs. |
| MPERR# | | I/O (4 mA) | | Memory Parity: This signal is an input to the System Controller from the Data Buffer Controller. The System Controller generates PEN# internally if the corresponding register is programmed to enable parity. The System Controller qualifies the MPERR# signal with the internally generated PEN#. |
| MA11 | 71 | O (4mA) | Register Programmable | Memory Address Bus Bit 11: A part of the multiplexed row/column address lines to the DRAMs. Depending on the kind of DRAM modules being used, this signal may or may not need to be buffered externally. |
| RAS4# | | O (4 mA) | | Row Address Strobe Bit 4: Each RAS# signal corresponds to a unique DRAM bank. Depending on the kind of DRAM modules being used, this signal may or may not need to be buffered externally. This signal, however, should be connected to the corresponding DRAM RAS# line through a damping resistor. |
| MA[10:0] | 72,73 75:83 | O (4 mA) | | Memory Address Bus Bits 10–0: Multiplexed row/column address lines to the DRAMs. |
| REFRESH# | 100 | I-CMOS | | Refresh: Driven by the Integrated Peripherals Controller, this input to the System Controller starts a refresh cycle on local DRAM. |
| DBCTL2# | | O (4 mA) | | Data Buffer Control Line. |
| NVMCS | 123 | O (4 mA) | | NVRAM Chip Select: If the current cycle has been decoded as an access to NVRAM, then this pin is used to issue the chip select signal. NVRAM is used for storing the system configuration information and is required for "plug and play" support. The NVRAM must sit on the XD bus. |

System 100 supports the new memory architecture called Unified Memory Architecture (UMA). Under this new architecture, a graphics/video accelerator device uses a part of the system memory as a frame buffer. This will eliminate the need for a separate graphics DRAM, enabling a memory cost savings of 1 MB DRAM or more. In a UMA architecture, a memory bus is shared between System Controller 114 and a VGA chip (shown in FIG. 1 as GUI 124). UMA Arbiter Interface 220 manages this sharing of the memory bus.

ISA Bus Interface 210 gains control when decoding logic in Integrated Peripherals Controller 116 detects that no PCI device has claimed a cycle. ISA Bus Interface 210 monitor status signals MEMCS16#, IOCS16#, and IOCHRDY, and performs a series of synchronization of control and status signals between ISA bus 118 and the CPU 102. Table 5 describes the I/O signals of the UMA arbiter interface 220 and ISA Bus Interface 210.

TABLE 5

UMA Arbiter Interface Signals and ISA Bus Interface Signals

| Signal Name | Pin No. | Signal Type | Selected By | UMA Arbiter Interface Signals Signal Description |
|---|---|---|---|---|
| MREQ# | 178 | I-TTL | | Memory Request: This input is connected to MREQ# output of the GUI device for a unified memory scheme. This signal indicates to the System Controller that the GUI wants control of the memory bus. |
| MGNT# | 177 | O (4 mA) | | Memory Grant: This output is connected to the MGNT# input of the GUI device for a unified memory scheme. This signal indicates to the GUI that it has been granted control of the memory bus. |
| LA[23:9] | 101:103, 106:117 | I/O CMOS (8 mA) | | System Address Bus: LA[23:9] and SA[8:0] on the Integrated Peripherals Controller provide the memory and I/O access on the ISA bus. The addresses are output when the System Controller owns the ISA bus and are inputs when an external ISA master owns the bus. LA[23:9] have internal pull-ups which are disable when in the Suspend mode. |
| MASTER# | 122 | I-CMOS | | Master: An ISA bus master asserts MASTER# to indicate that it has control of the ISA bus. Before the ISA master can assert MASTER#, it must first sample DACK# active. Once MASTER# is asserted, the ISA master has control of the ISA bus until it negates MASTER#. |
| AEN | 121 | I-CMOS | | Address Enable: This input connected to the AEN pin of the Integrated Peripherals Controller to monitor ISA bus activity. |

TABLE 5-continued

UMA Arbiter Interface Signals and ISA Bus Interface Signals

| Signal Name | Pin No. | Signal Type | Selected By | UMA Arbiter Interface Signals Signal Description |
|---|---|---|---|---|
| SUSPEND | 124 | I-TTL | | Suspend: This signal is used to inform the System Controller about getting into the Suspend mode. SUSPEND needs to be pulled low to resume normal operation. |

Bus Arbiter Interface 212 provides arbitration between CPU 102, the DMA controller, ISA Bus masters, PCI Bus masters and refresh logic. During DMA, ISA Bus master cycles, PCI Bus master cycles and conventional refresh cycles, System Controller 114 asserts HOLD to CPU 102. CPU 102 will respond to an active HOLD signal by generating HLDA (after completing it current bus cycle) and placing most of its output in I/O pins in a high impedance state. After the CPU relinquishes the bus, System Controller 114 responds by issuing REFRESH# (refresh cycle) or AHOLD (PCI masters, ISA bus master or DMA cycle), depending on the requesting device. Table 6 provided description of the I/O signals for the Bus Arbiter Interface 212.

TABLE 6

Bus Arbiter Interface Signals

| Signal Name | Pin No. | Signal Type | Selected By | Bus Arbiter Interface Signals Signal Description |
|---|---|---|---|---|
| HREQ | 181 | I-TTL | | Hold Request: Master or DMA cycle request from the Integrated Peripherals Controller. An external pull-up is required for normal operation. |
| TMOD# | | I-TTL | Strap Option at RESET | Strap Signal for ATE (Automatic Test Equipment) Test Mode Operation: During power-up reset, this is the strap pin to enter the test mode operation. If TMOD = "high" during power-up reset, it means normal operation. If TMOD = "low" the system enters test mode. |
| AHOLD | 7 | O (8 mA) | | Address Hold: This signal is used to tristate the CPU address bus for internal cache snooping. |
| LOCK# | 9 | I-TTL | | CPU Bus Lock: The processor asserts LOCK# to indicate the current bus cycle is locked. It is used to generate PLOCK# for the PCI bus. LOCK# has an internal pull-down resistor that is engaged when HLDA is active. |
| BOFF# | 8 | 0 (8 mA) | | Back-off: This pin is connected to the BOFF# input of the CPU. This signal is asserted by the System Controller during PCI/retry cycles. |

PCI Bus Interface 214 manages PCI Bus 120. Table 7 provides a description of the I/O signals of the PCI Bus Interface 214.

TABLE 7

PCI Bus Interface Signals

| Signal Name | Pin No. | Signal Type | Selected By | PCI Bus Interface Signals Signal Description |
|---|---|---|---|---|
| C/BE[3:0]# | 125:128 | I/O-TTL (PCI) | | PCI Bus Command and Byte Enables 3:0: C/BE[30]# are driven by the current bus master (CPU or PCI) during the address phase of a PCI cycle to define the PCI command, and during the data phase as the PCI byte enables. The PCI commands indicate the current cycle type, and the PCI byte enables indicate which byte lanes carry meaningful data. C/BE[3:0]# are outputs from the System Controller during CPU cycles that are directed to the PCI bus. C/BE[3:0]# are inputs during PCI master cycles. |
| FRAME# | 133 | I/O-TTL (PCI) | | Cycle Frame: Every CPU cycle is translated by the System Controller to a PCI cycle if it is not a local memory cycle. FRAME# is asserted to indicate the beginning and the duration of an access. |
| IRDY# | 134 | I/O-TIL (PCI) | | Initiator Ready: The assertion of IRDY# indicates the current bus master's ability to complete the current data phase. IRDY# works in conjunction with TRDY# to indicate when data has been transferred. A data phase is completed on each clock that TRDY# and IRDY# are both sampled asserted. Wait states are inserted until both IRDY# and TRDY# are asserted together. IRDY# is an output from the System Controller during CPU cycles to the PCI bus. IRDY# is an input when the System Controller acts as a slave. |
| TRDY# | 135 | I/O-TTL (PCI) | | Target Ready: TRDY# indicates the target device's ability to complete the current data phase of the transaction. It is used in conjunction with IRDY#. A data phase is completed on each clock that TRDY# and IRDY# are both sampled asserted. Wait states are inserted on the bus until both IRDY# and TRDY# are asserted together. |

TABLE 7-continued

PCI Bus Interface Signals

| Signal Name | Pin No. | Signal Type | Selected By | PCI Bus Interface Signals Signal Description |
|---|---|---|---|---|
| | | | | TRDY# is an output from the System Controller when the System Controller is the PCI slave. TRDY# is an input when the System Controller is a master. |
| DEVSEL# | 136 | I/O-TTL (PCI) | | Device Select: When asserted, DEVSEL# indicates that the driving device has decoded its address as the target of the current access. DEVSEL# is an output when System Controller is a PCI slave. During CPU-to-PCI cycles, DEVSEL# is an input. It is used to determine if any device has responded to the current bus cycle, and to detect a target abort cycle. Master abort termination results if no decode agent exists in the system, and no one asserts DEVSEL# within a fixed number of clocks. |
| STOP# | 137 | I/O-TTL (PCI) | | Stop: STOP# indicates that the current target is requesting the master to stop the current transaction. This signal is used in conjunction with DEVSEL# to indicate disconnect, target abort, and retry cycles. When the System Controller is acting as a master on the PCI bus, if STOP# is sampled active on a rising edge of LCLK, FRAME# is negated within a maximum of three clock cycles. STOP# may be asserted by the System Controller. Once asserted, STOP# remains asserted until FRAME# is negated. |
| AD[31:0] | 138:141, 143:155, 158:164, 166:173 | I/O-TTL (PCI) | | PCI Address and Data: AD[31:0] are bi-directional address and data lines of the PCI bus. The AD[31:0] signals sample or drive the address and data on the PCI bus. During power-up reset, the System Controller will drive the AD lines by default. This bus also serves as a conduit for receiving address information during ISA master cycles. The Integrated Peripherals Controller conveys the SA[8:0] information |

TABLE 7-continued

PCI Bus Interface Signals

| Signal Name | Pin No. | Signal Type | Selected By | PCI Bus Interface Signals Signal Description |
|---|---|---|---|---|
| PLOCK# | 132 | I/O-TTL (PCI) | | to the System Controller on the AD lines. PCI Lock: PLOCK# is used to indicate an atomic operation that may require multiple transactions to complete. When PLOCK# is asserted, non-exclusive transactions may proceed to an address that is not currently locked. |

Universal Serial Bus Interface 216 is used for telecommunications, keyboards or audio peripherals. Table 8 provides a description of the I/O signals of the Universal Serial Bus Interface.

TABLE 8

Universal Serial Bus Interface Signals

| Signal Name | Pin No. | Signal Type | Selected By | Universal Serial Bus Interface Signals Signal Description |
|---|---|---|---|---|
| USBDAT+ | 201 | I/O-Analog | | Differential Serial Data |
| USBDAT− | 202 | I/O-Analog | | Differential Serial Data |

IPC/DBC Interface 218 is used to interface to the Integrate Peripherals Controller 116 and Data Buffer Controller 112. Table 9 describes the I/O signals of the IPC and the DBC interface 218.

TABLE 9

IPC/DBC Interface Signals

| Signal Name | Pin No. | Signal Type | Selected By | IPC/DBC Interface Signals Signal Description |
|---|---|---|---|---|
| DBCOE# | 185 | O (4 mA) | | DBC Output Enable: DBCOE# and MMDOE# along with MDOE# and HDOE#, form the encoded commands that are sent out to the Data Buffer Controller. These commands inform the Data Buffer Controller about the current cycle type and enable it to perform the appropriate data steering, latching and direction controls. |
| MMDOE# | 184 | O (4 mA) | | See DBCOE# |
| MDOE# | 182 | O (4 mA) | | Memory Data Output Enable: This signal is used along with DBCOE#, MMDOE#, and HDOE# to form the encoded commands that are sent out to the Data Buffer Controller. When asserted, this signal enables data to be put out on the MD bus. MDOE# is asserted for CPU writes to cache/DRAM, CPU writes to PCI, PCI reads from cache/DRAM, L2 cache write-back cycles, and PCI writes to DRAM. |
| HDOE# | 183 | O (4mA) | | Host Data Output Enable: This signal is used along with DBCOE#, MMDOE#, and MDOE# signal to form the encoded commands that are sent out to the Data Buffer Controller. When asserted, this signal enables data to be put out on the HD bus. HDOE# is asserted for CPU reads from DRAM/PCI bus, PCI writes to cache, CPU linefills, Suspend mode indication, and reset state indication. |
| DLE[1:0]# | 187, 186 | O (4 mA) | | Data Latch Enables: These lines are connected to the Data Buffer Controller and used to latch the HD and MD data bus depending on which cycle is occurring. |
| MDLE# | 180 | O (4 mA) | | Memory Data Latch Enable: This signal is connected to the Integrated Peripherals Controller and controls the data flow from PCI AD[31:0] bus to the high 32-bit memory data bus, MD[63:32], and vice versa. It is used to latch the data during CPU writes to PCI and PCI writes to DRAM and L2 cache. |
| 3VDRAM# | | I-TTL | Strap Option at RESET | Strap option for 3.3V DRAM: At power-up reset, this pin functions as a strapping option for 3.3V or 5.0V DRAM operation. |
| MEMR# | 118 | I-CMOS | | Memory Read Command: This input is connected to pin 78 (MEMR#) of the Integrated Peripheral Controller and it monitors ISA memory read operations. |

TABLE 9-continued

IPC/DBC Interface Signals

| Signal Name | Pin No. | Signal Type | Selected By | IPC/DBC Interface Signals Signal Description |
|---|---|---|---|---|
| DBCTL0# | | O (4 mA) | | Data Buffer Control Line. |
| MEMW# | 120 | I-CMOS | | Memory Write Command. This input monitors ISA memory write operations. |
| DBCTL1# | | O (4 mA) | | Data Buffer Control Line. |

Figure 3:
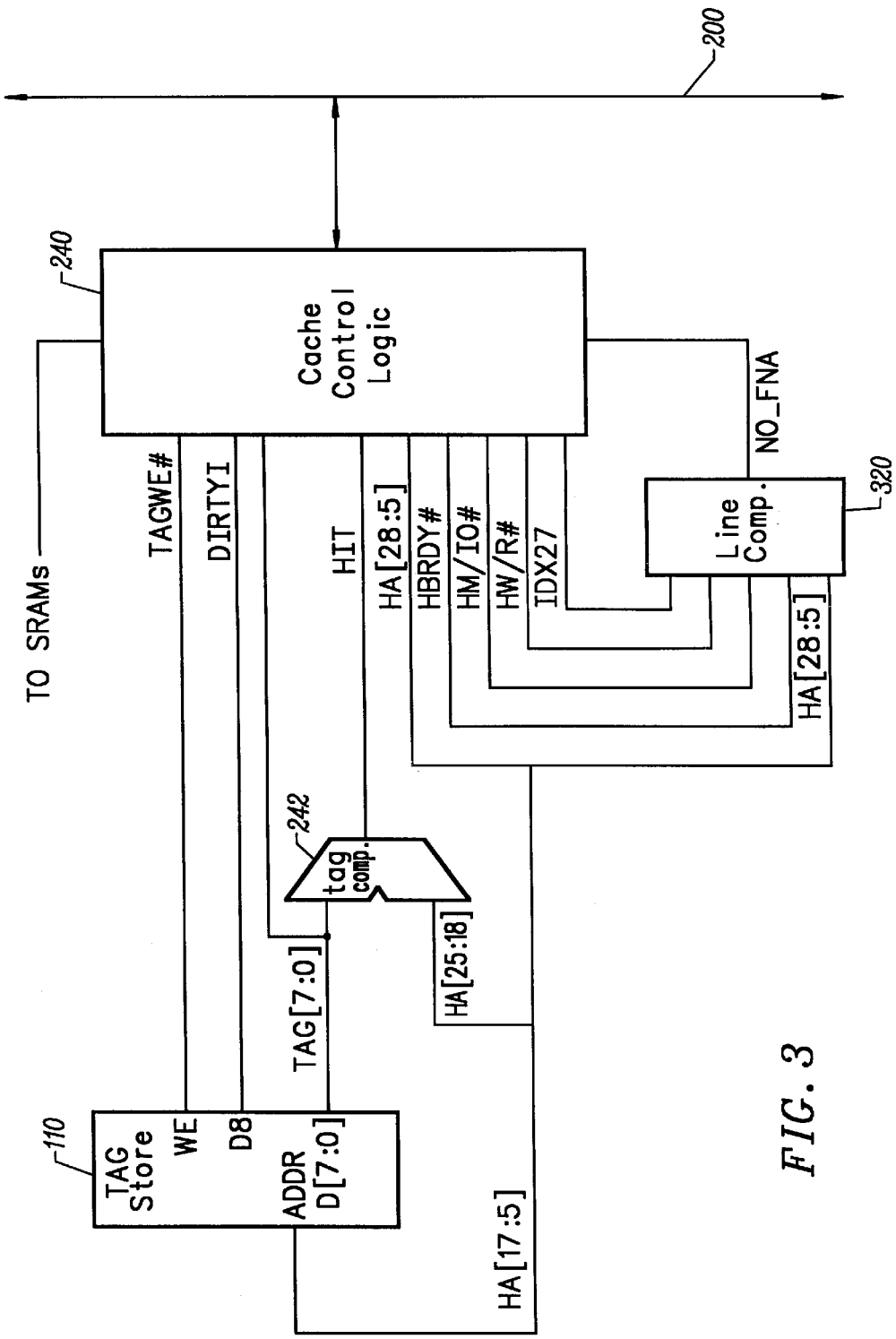
FIG. 3 is a block diagram of the tag store and relevant portions of cache control interface found in the system controller depicted in FIG. 2.

FIG. 3 provides a more detailed description of a portion of cache control interface 206. Cache control interface 206 includes cache control logic 240, a line comparator 320, and an 8 bit tag comparator 242. The disclosed embodiment L2 cache includes 8K lines (32 bytes per line); therefore, tag store 110 also includes 8K lines. The low order bits of the memory address are used to access the proper line in the tag store and the high order bits are stored as the tag. In the disclosed embodiment, the tag is 8 bits. However, tag store 110 is 9 bits wide so that each line in tag store 110 can store a dirty bit. The system as depicted in FIG. 1 can support various L2 cache sizes. Table 10 indicates which bits of the memory address to use as the tag for various L2 cache sizes. Table 10 is just one example of how to divide the memory address bits, other examples are also within the spirit of the present invention.

TABLE 10

Tag Compare Table

| | L2 Cache Size | | | | | |
|---|---|---|---|---|---|---|
| Tag Data | 64 KB | 128 KB | 256 KB | 512 KB | 1 MB | 2 MB |
| TAG0 | A16 | A24 | A24 | A24 | A24 | A24 |
| TAG1 | A17 | A17 | A25 | A25 | A25 | A25 |
| TAG2 | A18 | A18 | A18 | A26 | A26 | A26 |
| TAG3 | A19 | A19 | A19 | A19 | A27 | A27 |
| TAG4 | A20 | A20 | A20 | A20 | A20 | A28 |
| TAG5 | A21 | A21 | A21 | A21 | A21 | A21 |
| TAG6 | A22 | A22 | A22 | A22 | A22 | A22 |
| TAG7 | A23 | A23 | A23 | A23 | A23 | A23 |
| Dirty Bit | Dirty | Dirty | Dirty | Dirty | Dirty | Dirty |

The choice of level 2 cache size is dependent on the system design. For illustrative purposes, FIG. 3 assumes a cache size of 256 KB. Thus, HA[25:18] is used as the tag. The input to tag store 110 includes the low order bits of the memory address HA[17:5] which is supplied to tag store 110 by cache control logic 240. The data port D[8:0] of tag store 110 is connected to cache control logic 240. Low order 8 bits D[7:0] transmit the tag and high order bit D[8] is the dirty bit. D[8], which is also labeled DIRTYI, is connected to cache control logic 240. D[7:0] is connected to tag comparator 242. The D[8:0] signal is bidirectional and has a default to the output state. D[8:0] becomes an input when write enable WE is driven. The write enable for tag store 110 is driven by cache control logic 240 (the signal TAGWE#) and serves as the tag write enable and the dirty bit write enable. To write a tag or a dirty bit into the particular memory device used herein for tag store 110, TAGWE# must be asserted for half a clock period prior to writing to tag store 110. Subsequent to the half clock period needed for setup time, one clock is needed to write the new dirty bit or tag. Thus, in the case where the writing of the dirty bit and tag can be skipped, the system can save 1.5–2 clock periods.

Tag comparator 242 compares the high order bits from the memory address HA[25:18] to TAG[7:0] (which is D[7:0] from tag store 110). The output of tag comparator 242, HIT, is connected to cache control logic 240 and indicates if there is a hit in the L2 cache.

Cache control logic 240 sends the following 5 signals to line comparator 320: HA[28:5], HBRDY#, HMIO#, HWR# and IDX27. Note that line comparator 320 only receives a portion (or subset of bits) of the address HA. This is because only the address bits HA[28:5], which comprise the line address, are needed to address the lines in the cache. For example, addresses with the same HA[28:5] but a different HA[4:3] are located in the same line in the cache. HBRDY# is the System Controller's internal representation of BRDY#. HMI/O# is the System Controller's internal representation of MI/O#. HW/R# is the System Controller's internal representation of W/R#. Line comparator 320 determines whether successive bus cycles are writes to the L2 cache at the same line location. If successive bus cycles are writes to different lines, the signal NO_FNA is asserted and is sent to cache control logic 240. The purpose of line comparator 320 is to save clock cycles by not setting a dirty bit which has been recently set. For example, suppose a first write to the L2 cache resulted in a hit causing the dirty bit to be set. If the next bus cycle is a write to the L2 cache at the same line as the previous cycle, then the exact same dirty data in the L2 cache is being overwritten. In that situation, cache control logic 240 would know that dirty bit was set in the previous cache write and that there is no need to waste clock cycles setting the dirty bit a second time.

During a write to memory, system 100 may check for a hit in the L2 cache. The low order bits of the memory address, HA[17:5] are sent by cache control logic 240 to the tag store 110 to access the proper line in tag store 110. The proper tag is accessed and sent to tag comparator 242 and compared with the high order bits of the memory address HA[25:18]. If the tag matches the high order bits of the memory, then tag comparator 242 communicates to cache control logic 240 that there is a hit which indicates that the line of data which is the subject of the bus cycle is in the L2 cache. If there was a hit then cache control logic 240 (1) sends an address and write enable to the L2 cache (SRAMs) 106 and (2) sets the corresponding dirty bit if address comparator 320 asserts NO_FNA. Setting the dirty bit includes driving the write enable pin of tag store 110 (e.g. by asserting TAGWE#) and driving a logic one on the DIRTYI signal. If there was a miss in the L2 cache during a write cycle, the data is only written to main memory.

During a read from memory, if the is an L1 cache miss, system 100 will check for a hit in the L2 cache as described above. If there is a hit, the data is read from the L2 cache and the tags and dirty bits are not changed. If there is a miss in the L2 cache, the data is fetched from main memory, delivered to CPU 102 and stored in the L2 cache. When storing the data in the L2 cache, cache control logic 240 drives TAGWE#, stores a new tag and resets the dirty bit. Before storing the new data and tag, cache control logic will check the dirty bit of the existing data in the L2 cache. If the dirty bit is set, the data must be written back to main memory before the new data is written to the L2 cache.

Figure 4:
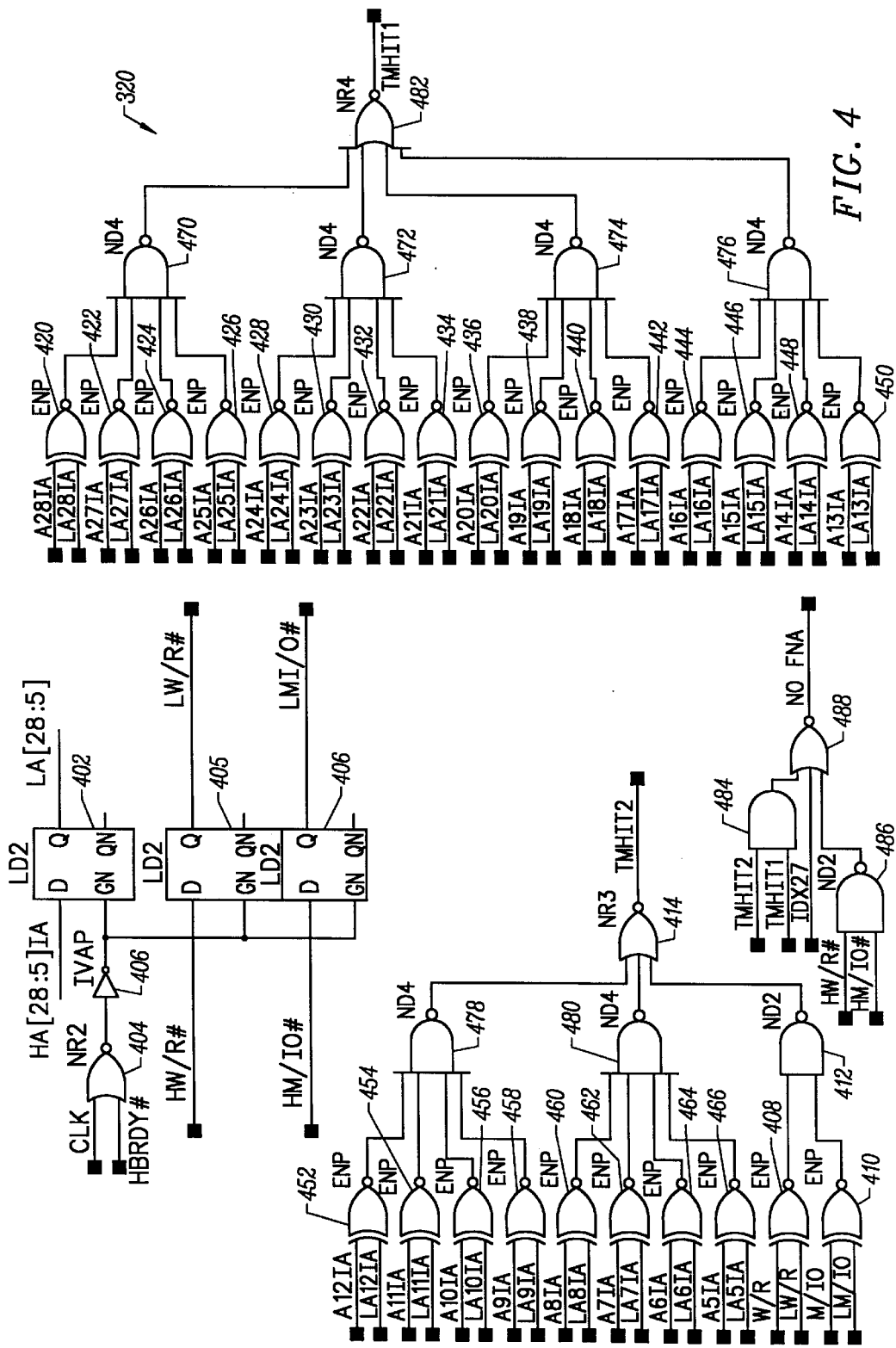
FIG. 4 is a schematic of the line comparator depicted in FIG. 3.

FIG. 4 is a schematic of line comparator 320. Register 402 stores the memory address of the previous bus cycle. The input to register 402 is the current 24 bit address, HA[28:5].

The clock input to register 402 (labeled GN) is received from the output of inverter 406. The input of inverter 406 comes from the output of NOR gate 404. The inputs to NOR gate 404 are the signals CLK and HBRDY#. Thus, register 402 clocks in a new address at the end of every bus cycle. The output of register 402, LA [28:5] is the previous memory address. Alternative embodiments include storing more than one previous address.

Register 405 has HW/R# at its input and the same clock input as register 402. Thus, register 405 stores the state of the signal HW/R# from the previous cycle. The output of register 405 is LW/R#. Register 405 is used to make sure that address comparator 320 fails to assert NO_FNA only when successive bus cycles are both writes. HW/R# is at logic level one for a write. HW/R# from the present cycle and LW/R# to the previous cycle are compare by exclusive NOR gate 408.

Register 406 stores the value of the HM/IO# signal for the previous cycle. Register 406 has HM/IO# as its input, uses the same clock as registers 402 and 405, and has LM/IO# as its output. The signals HM/IO# and LM/IO# are compared by exclusive NOR gate 410. The outputs of exclusive NOR gates 408 and 410 are the inputs of NAND gates 412. The output of NAND gate 412 is one of the three inputs to NOR gate 414.

Each of the current address bits A[28:5] are compared to the corresponding address bit for the previous bus cycle LA[28:5]. For example, bit 28 of the present address (A28) is compared to bit 28 of the previous address (LA28) by sending both signals to exclusive NOR gate 420. Similarly, the other bits of the current and previous addresses are compared by sending the bits to exclusive NOR gates: the input to exclusive NOR gate 422 are signals A27 and LA27, the inputs to exclusive NOR gate 424 are signals A26 and LA26, the inputs to exclusive NOR gate 426 are A25 and LA25, the inputs to exclusive NOR gate 428 are signals A24, LA24 and A25 the inputs to exclusive NOR gate 430 are signals A23 and LA 23, the inputs to exclusive NOR gate 432 are signals A22 and LA22, the inputs to exclusive NOR gate 434 are signals A21 and LA21, the inputs to exclusive 436 are signals A20 and LA20, the inputs to exclusive to NOR gate 438 are signals A19 and LA19, the inputs to exclusive NOR gate 440 are signals A18 and LA18, the inputs to exclusive NOR gate 442 are signals A17 and LA17, the inputs to exclusive NOR gate 444 are signals A16 and LA16, the inputs to exclusive NOR gate 446 are signals A15 and LA15, the inputs to exclusive NOR gate 448 are signals A14 and LA14, the inputs to exclusive NOR gate 450 are signals A13 and LA13, the inputs to exclusive NOR gate 452 are signals A12 and LA12, the inputs to exclusive NOR gate 454 are signals A11 and LA11, the inputs to exclusive NOR gate 456 are signals A10 and LA10, the inputs to exclusive NOR gate 458 are signals A9 and LA9, the inputs to exclusive NOR gate 460 are signals A8 and LA8, the inputs to exclusive NOR gate 462 are signals A7 and LA7, the inputs to exclusive NOR gate 464 are signals A6 and LA6, the inputs to exclusive NOR gate 466 are signals A5 and LA5.

If two corresponding address bits are the same, the output of the exclusive NOR gate is logic level one. When the current address matches the previous (or preceding) address the output of all the exclusive NOR gates (420–466) are logic level one. The outputs of all of the exclusive NOR gates are then sent to NAND gates. The inputs to NAND gates 470 are the outputs from exclusive NOR gates 420, 422, 424 and 426. The inputs to NAND gate 472 are the outputs of exclusive NOR gates 428, 430, 432 and 434. The inputs to NAND gate 474 are the outputs from exclusive OR gates 436, 438, 440 and 442. The inputs to NAND gate 476 are the outputs from exclusive NOR gates 444, 446, 448 and 450. The inputs to NAND gate 478 are the outputs from exclusive or gates 452, 454, 456 and 458. The inputs to NAND gate 480 are the outputs from exclusive or gates 460, 462, 464 and 466. If the two addresses match (all the inputs to NAND gates are logic level one), the output of the NAND gates will be logic level zero.

The outputs of the NAND gates are sent to NOR gates. The inputs to NOR gate 482 are the outputs from NAND gates 470, 472, 474 and 476. The inputs to NOR gate 414 includes the outputs from NAND gates 478, 480 and 412. If two successive bus cycles are memory writes and their addresses are the same, the inputs to the NOR gates will be logic level zero and the outputs of the NOR gates will be logic level one. The output of NOR gate 472 is labeled TMHIT1. The output of NOR gate 414 is labeled TMHIT2, the two signals (TMHIT1 and TMHIT2) are both sent to AND gate 484. The output of AND gate 484 will be logic level one when the two addresses match. The output of AND gate 484 is an input to NOR gate 488. Another input to NOR gate 488 is a signal IDX27, which is used to disable the logic. The signal IDX27 is a static signal originating from an internal register and is normally at logic zero. A third input to NOR gate 488 is NAND gate 486. The inputs to NAND gate 486 are HW/R# and HM/IO#. When HW/R# is equal to logic level one, indicating a write, and HM/IO# is equal to logic level one indicating a memory cycle, the output of NAND gate 486 is logic level zero. The output of NOR gate 488 is labeled NO_FNA. This signal will be equal to logic level zero when the current address is equal to the previous address. The signal NO_FNA is at logic level one when the current address is not equal to the previous address, IDX27 is logic level zero and the current bus cycle is a memory write cycle. Alternative designs for the line comparator and alternative definitions of the behavior of the NO_FNA are also within the scope of the present invention as long as the system can determine when to avoid setting a dirty bit.

Generally, during the first clock of a bus cycle CPU 102 asserts ADS# and drives the write address, and comparator 320 compares successive addresses to determine NO_FNA. At the end of the second clock period cache control interface 206 determines whether there is a hit or miss in the L2 cache. During a write cycle, regardless of whether there is a hit or miss, data is written to the L2 cache at the end of the second clock period. If new tags or a new dirty bit need to be written to tag store 110, during the third clock period TAGWE# is asserted. Tag bits and dirty bits are written during the fourth clock period, if at all.

Figure 5:
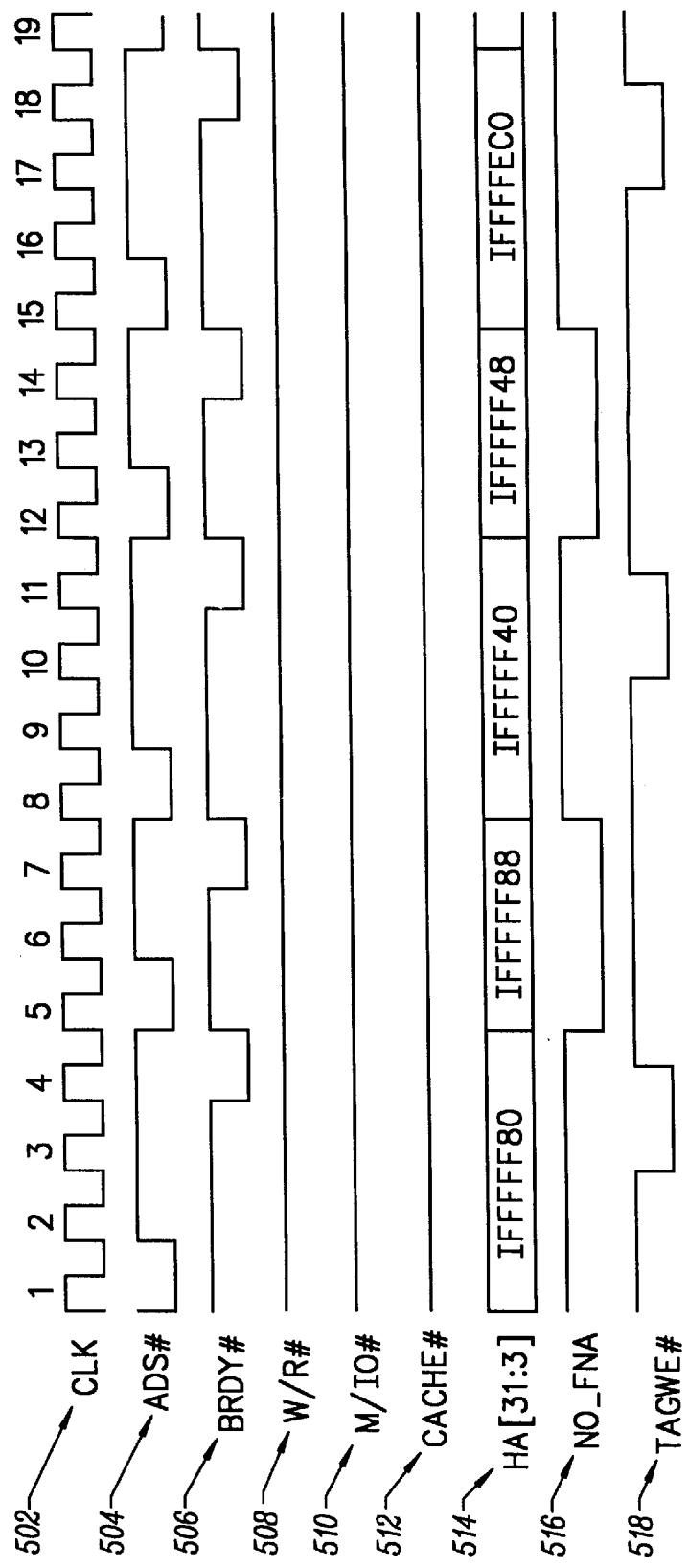
FIG. 5 is a timing diagram which explains the behavior and timing of certain signals in the hardware depicted in FIGS. 1–4.

FIG. 5 is a timing diagram that depicts the behavior of some of the signals described above. Line 502 depicts the clock in the system controller 114. Line 504 depicts the signal ADS#, which is the address strobe. The address strobe is an address status output of CPU 102 which indicates that a new bus cycle is currently being driven by CPU 102. This signal is used by system 100 as an indication that CPU 102 has started a bus cycle. Line 506 depicts the signal BRDY# (or HBRDY#), burst ready. Burst ready is an input to CPU 102 which indicates that system 100 has presented valid data on the data pins of CPU 102 in response to a read or that system 100 has accepted the write data in response to a write. Each cycle generated by CPU 102 will either be a single transfer read/write or a burst cycle. For a single data transfer, one BRDY# is expected. A bus cycle starts with ADS# being asserted by CPU 102 and ends with BRDY# asserted by System Controller 114. For a burst transfer, the cycle ends when the fourth BRDY# is returned because four data transfers are expected by CPU 102.

Line 508 depicts W/R# (or HW/R#), write/read. Write/read is asserted by CPU 102 from the clock in which ADS# is asserted until after the last BRDY#. Line 510 depicts M/IO# (or HM/IO#), which is also called memory/input-output signal. MI/O# is driven by CPU 102 and is valid from the same clock in which ADS# is asserted until the clock after the last BRDY#. M/IO# is equal to logic level one during a memory cycle and equal to logic level zero during an IO cycle. Line 512 depicts CACHE#, which is asserted by CPU 102 and indicates L1 cacheability of a read cycle or a write back if a cache write. If the pin is asserted for a write cycle, it indicates that the write cycle is a burst write back cycle. CACHE# is driven to its valid level in the same clock as the assertion of ADS# and remains valid after the last BRDY#. Thus, during a write cycle if CACHE# is equal to one, the bus cycle is a single write. If CACHE# is equal to zero, the cycle is a burst write cycle and four writes are expected. Line 514 depicts HA[31:3] which includes the 29 high order bits of the memory address. Line 516 depicts NO_FNA which is the output of line comparator 320. Line 518 shows TAGWE# which is the tag write enable.

In the timing diagram of FIG. 5, each clock period is numbered for information purposes. Each bus cycle starts with ADS# being asserted, ends with BRDY# being asserted and lasts for a number of clock periods. The timing diagram of FIG. 5 shows five bus cycles. Bus cycle one includes clock periods 1–4. Bus cycle two includes clock periods 5–7. Bus cycle three includes clock periods 8–11. Bus cycle four includes clock periods 12–14. Bus cycle five includes clock periods 15–18. The timing diagram of FIG. 5 assumes that all accesses to the L2 cache are hits.

Bus cycle one begins at clock period 1 when ADS# is asserted. CPU 102 drives address 1FFFFF80. For example purposes, assume that the previous address was different; therefore, NO_FNA is asserted (e.g. at logic level one). Because NO_FNA is at logic level one and there is a cache hit during a write cycle, the dirty bit for the line being written to in the cache must be set. Therefore, as discussed above, four cycles are needed to write data to the L2 cache, write a new tag store and set a dirty bit.

Bus cycle two begins at clock period 5 when ADS# is asserted and CPU 102 drives the address 1FFFFF88. The line address for bus cycle two is the same as the line address for bus cycle one, the previous bus cycle. NO_FNA will be at logic level zero because the current addresses matches the previous memory address. At the end of clock period 5, NO_FNA will be sampled by cache control logic 240. At the end of clock period 6 data will be written to the L2 cache. During clock period 7, BRDY# is returned to CPU 102 to end bus cycle 2. Since NO_FNA is at logic level zero, there is no need to set the dirty bit.

Bus cycle three begins at clock period 8 with ADS# being asserted and ends at the end of clock period 11 with BRDY# being asserted. During clock period 8, CPU 102 drives address 1FFFFF40, which has a different line address than the previous address; therefore, NO_FNA is at logic level one and a dirty bit must be set. Bus cycle three utilizes four clocks and TAGWE# must be asserted during clock periods 10 and 11.

During bus cycle four CPU 102 drives memory address 1FFFFF48. Since the line address matches the previous line address, NO_FNA will be at logic level zero, data is written to the cache during clock period 13 and BRDY# is asserted during clock period 14.

Figure 6:
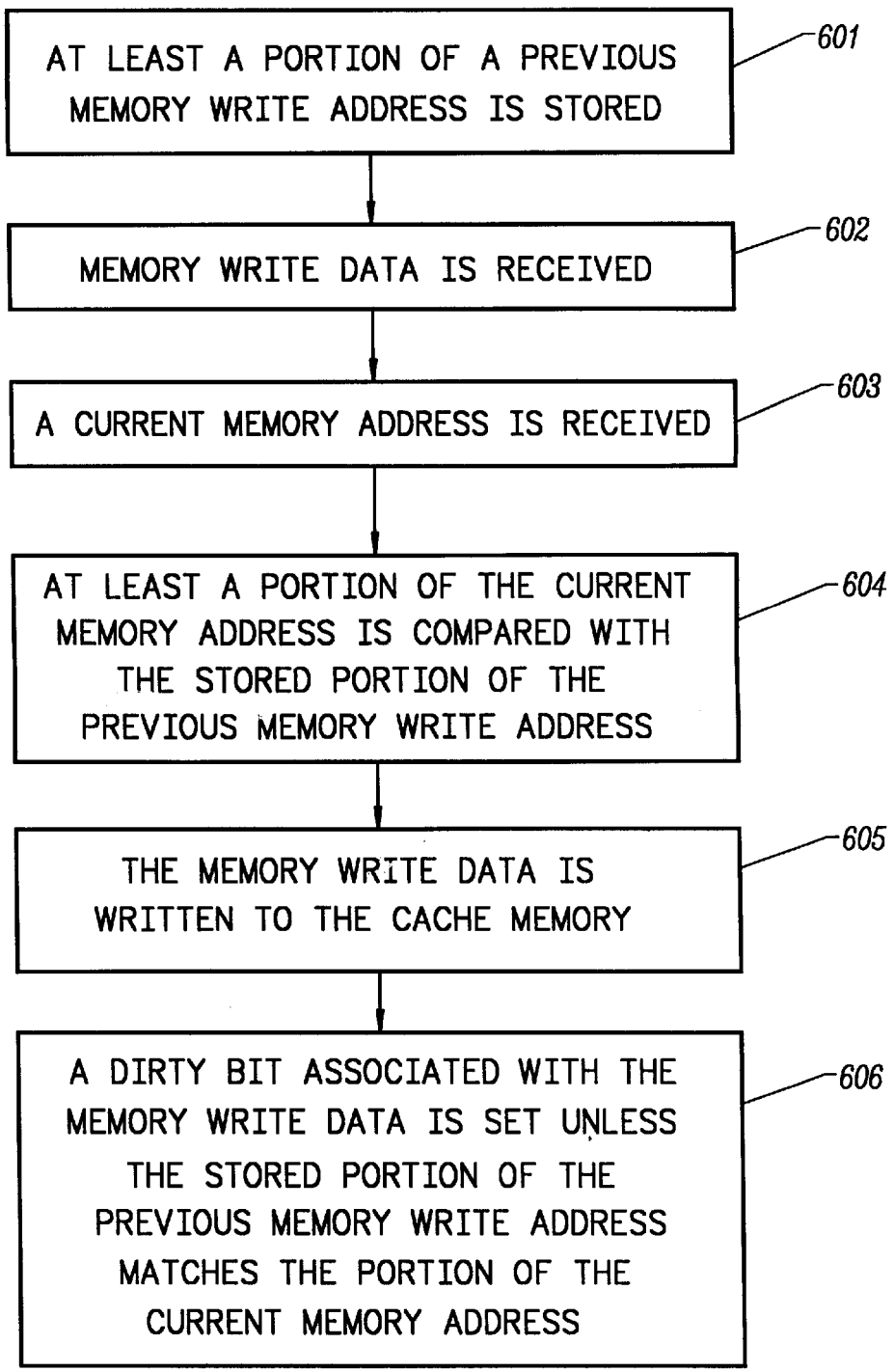
FIG. 6 is a flow chart illustrating a method for writing to a cache memory.

During bus cycle five CPU 102 asserts ADS# during clock period 15 and drives address 1FFFFEC0. Since the line address is different from the previous line address, NO_FNA is at logic level one. Data is written to the L2 cache during clock period 16. TAGWE# is asserted during clock periods 17 and 18, and a dirty bit is set in tag store 110. Because a dirty bit is set, the cycle takes four clocks and BRDY# is asserted during clock period 18. Note that for all the cycles WR#, M/IO# and CACHE# are not asserted (equal to logic level one). Thus, all five cycles are single memory writes. FIG. 6 is a flow chart illustrating a method for writing to a cache memory. At least a portion of a previous memory write address is stored in step 601. Memory write data is received in step 602. A current memory address is received in step 603. At least a portion of the current memory address is compared with the stored portion of the previous memory write address in step 604. The memory write data is written to the cache memory in step 605. A dirty bit associated with the memory write data is set in step 606 unless the stored portion of the previous memory write address matches the portion of the current memory address.

Although the disclosed embodiment utilizes a combined tag store and dirty bit store, the present invention can also be used to improve various other cache designs that utilize separate tag and dirty bit stores.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for writing to a cache memory, comprising the steps of:

storing at least a portion of a previous memory write address;

receiving memory write data;

receiving a current memory address;

comparing at least a portion of said current memory address with said stored portion of said previous memory write address;

writing said memory write data to said cache memory; and setting a dirty bit associated with said memory write data unless said stored portion of said previous memory write address matches said portion of said current memory address.

2. A method according to claim 1, wherein:

said cache memory is direct mapped.

3. A method according to claim 1, wherein:

said portion of said current memory address is a line address.

4. A method according to claim 1, wherein:

said cache memory includes a combined tag and dirty bit store.

5. A method according to claim 1, wherein:

said previous memory write address is a previous memory write address from an immediately preceding memory write cycle.

6. A method according to claim 1, wherein:

said previous memory write address is a previous memory write address from an immediately preceding memory cycle.

7. A method according to claim 6, further including the step of:

determining whether said immediately preceding memory cycle was a memory write.

8. A method according to claim 7, further including the step of:

checking said cache memory for a hit or a miss.

9. A method according to claim 8, further including the step of:

writing a tag to a tag store if said step of checking detects a miss.

10. A method according to claim 8, wherein:

said step of receiving a current memory address occurs during a first clock period of a first cycle;

said step of checking said cache memory for a hit or a miss occurs during a second clock period of said first cycle;

said step of determining whether said immediately preceding memory cycle was a memory write occurs during said first clock period of said first cycle; and said step of determining whether said portion of said previous memory write address matches said portion of said current memory address occurs during said first clock period of said first cycle.

11. A method according to claim 10, wherein:

said step of setting a dirty bit happens, if at all, during a fourth clock period of said first cycle.

12. A method for writing to a cache memory, comprising the steps of:

receiving write data;

receiving a current address;

writing said write data to said cache memory; and setting a dirty bit associated with said write data unless a previous bus cycle is a memory write cycle having a previous address and at least a subset of bits of said previous address matches at least a subset of bits of said current address.

13. A system for writing to a cache memory, said cache memory including a tag store and a dirty bit store, said dirty bit store having a write enable signal as an input, said system receiving an address and write data, said address including a plurality of address bits, comprising:

a tag comparator in communication with said tag store, said tag comparator receiving at least a first subset of said address bits;

a line comparator, said line comparator having a first input, said first input receives at least a second subset of said address bits, said line comparator determines whether two or more bus cycles write to a single line in the cache memory; and cache control logic in communication with said tag store, said dirty bit store, said tag comparator and said line comparator, said cache control logic is adapted to assert said write enable signal, said cache control logic does not assert said write enable signal if said line comparator indicates that a current bus cycle and a previous bus cycle are writes to an identical line in the cache memory.

14. A system according to claim 13, wherein:

said line comparator includes:

a first register, said first register stores at least a portion of a memory address of a previous bus cycle, in communication with said first input; and first logic comparing said first register with said first input.

15. A system according to claim 13, wherein:

said cache memory is a direct mapped cache.

16. A system for writing a cache memory, said system receiving an address and write data, said address including a plurality of address bits, comprising:

a tag store, said tag store receives a first subset of address bits, stores tags and stores dirty bits;

a tag comparator in communication with said tag store, said tag comparator receiving at least a first subset of said address bits, said tag comparator having an output indicating whether a hit has occurred;

a line comparator, said line comparator having a first input, said first input receives at least a second subset of said address bits, said line comparator including a first register and first logic, said first register being in communication with said first input, said first logic being in communication with said first register and said first input, said line comparator determines whether two or more bus cycles write to a single line in the cache memory; and cache control logic in communication with said tag store, said tag comparator and said line comparator, said control logic is adapted to set a dirty bit, said cache control logic does not set said dirty bit if said line comparator indicates that a current bus cycle and a previous bus cycle are writes to an identical line in the cache memory.

17. A system for controlling a cache memory, comprising:

first means for receiving write data and a current write address, said current write address including a line address;

second means for determining whether said cache memory has a hit;

third means for determining whether an immediately preceding bus cycle was a memory write to a preceding write address such that said preceding write address includes said line address;

fourth means for writing said write data to said cache memory; and fifth means for setting a dirty bit associated with said write data, said fifth means not setting said dirty bit if said third means determines that said immediately preceding bus cycle was a memory write and said preceding write address includes said line address.

18. A system for writing to a cache memory, said cache memory including a tag store and a dirty bit store, said system receiving an address and write data, said address including a plurality of address bits, comprising:

a tag comparator in communication with said tag store, said tag comparator receiving at least a first subset of said address bits;

a line comparator, said line comparator determines whether two or more write operations to the cache memory write to a single line in the cache memory, said line comparator further comprises:

a first input, said first input receives at least a second subset of said address bits, a first register, said first register stores at least a portion of a memory address of a previous bus cycle, first logic that compares said first register with said first input, a second input, said second input receives a current memory /IO status, a second register in communication with said second input, said second register stores a previous memory/IO status for a previous bus cycle, second logic, said second logic compares said second register with said second input, a third input, said third input receives a current write/read status, a third register in communication with said third input, said third register stores a previous write/read status for a previous bus cycle, and third logic, said third compares said third register with said third input, said line comparator having an output based on said first logic, said second logic and said third logic; and cache control logic in communication with said tag store, said tag comparator and said line comparator.

19. A system according to claim 18, wherein:

said cache control logic drives a dirty bit write enable signal if said tag comparator indicates a hit during a write to said cache unless said output of said line comparator indicates that:

said first register matches said first input;

said second register matches said second input; and said third register matches said third input.

* * * * *